(12) United States Patent  
Yamasaki et al.

(10) Patent No.: US 7,159,057 B2  
(45) Date of Patent: Jan. 2, 2007

(54) EVALUATION CHIP

(75) Inventors: Hiroshi Yamasaki, Hachiouji (JP); Kenichiro Nagatomo, Hachiouji (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 158 days.

(21) Appl. No.: 10/989,025

(22) Filed: Nov. 16, 2004

(65) Prior Publication Data

US 2005/0216636 A1   Sep. 29, 2005

(30) Foreign Application Priority Data

Mar. 26, 2004   (JP)   ............................. 2004-093053

(51) Int. Cl.
*G06F 9/46* (2006.01)
(52) U.S. Cl. ..................... 710/264; 710/266
(58) Field of Classification Search ............... None
See application file for complete search history.

(56) References Cited

U.S. PATENT DOCUMENTS 5,594,905 A * 1/1997 Mital ..................... 710/260

6,539,448 B1 * 3/2003 Deng ..................... 710/260
2004/0199694 A1 * 10/2004 Yiu et al. ................ 710/264
2005/0010707 A1 * 1/2005 Francis ................... 710/260
2005/0102460 A1 * 5/2005 Wahler ................... 710/269

FOREIGN PATENT DOCUMENTS

JP          5-151014 A     6/1993

* cited by examiner

*Primary Examiner*—Glenn A. Auve
(74) *Attorney, Agent, or Firm*—Shinjyu Global IP

(57) ABSTRACT

An evaluation chip is disclosed whose interrupt priority order can be changed freely. A plurality of interrupt priority order determining circuits 20-1 to 2-4 perform a logical operation on a plurality of signals S11 to S14 used for interrupt priority order modifying control that are applied from outside and a plurality of interrupt signals S31-1 to S31-4, and output interrupt modifying signals S24-1 to S24-4. A plurality of interrupt modules 30-1 to 30-4 perform a logical AND operation on the plurality of signals S24-1 to S24-4 and a plurality of interrupt request signals S15-1 to S15-4 that are applied from outside, and output the signals S31-1 to S31-4. An address generating circuit 40 encodes the plurality of signals S31-1 to S31-4 and generates interrupt vector addresses 40. A microcomputer core 50 executes interrupt instructions that have been fetched from an external program memory 100, based on the addresses S40.

16 Claims, 3 Drawing Sheets

EVA CHIP OF WORKING EXAMPLE 2

EVA CHIP OF WORKING EXAMPLE 1

EVALUATION CHIP

BACKGROUND OF THE INVENTION

1. Field of the Invention

The present invention relates to an evaluation chip (hereafter "EVA chip") that is an integrated circuit for program development for a microcomputer used in an emulator, for example. The present invention relates especially to EVA chips in which an interrupt priority order of instruction execution can be freely changed.

2. Background Information

A conventional EVA chip is disclosed in JP H5-151014A, for example. JP H5-151014A discloses an EVA chip that evaluates a program stored in an external program memory and incorporates a central processing unit (hereafter "CPU") portion and a data latch portion, for example. In this kind of EVA chip, instructions fetched from the program memory are decoded and the decoded results are executed by the CPU portion. After the instruction execution results are temporarily retained in the data latch portion, the results are selectively output to the outside of the chip. The data are evaluated by an externally provided trace circuit, for example.

In the EVA chip disclosed in JP H5-151014A, an interrupt circuit is provided in the chip if interrupt processes are executed by a plurality of interrupt request signals that is applied from outside to the program stored in the program memory. When a plurality of interrupt request signals is applied from outside, the interrupt circuit generates a plurality of interrupt signals in accordance to a predetermined interrupt priority order, encodes the signals to generate interrupt vector addresses, and executes the interrupt processes with the interrupt vector addresses in the CPU portion. Here, the interrupt priority order is predetermined because the interrupt priority order is determined by the specification, so that the configuration of the interrupt circuit can be simplified by fixing the priority order.

However, EVA chips incorporating the conventional interrupt circuit were disadvantageous and inconvenient in that when the priority order specification in the interrupt portion of the internal CPU portion is changed or the priority order specification is different in the interrupt portion of the CPU portion of a series product, the EVA chips cannot be used because the interrupt priority that is featured in the EVA chip is fixed.

In view of the above, it will be apparent to those skilled in the art from this disclosure that there exists a need for an improved evaluation chip. This invention addresses this need in the art as well as other needs, which will become apparent to those skilled in the art from this disclosure.

SUMMARY OF THE INVENTION

In order to solve the aforementioned problems, an EVA chip according to a first aspect of the present invention includes a plurality of interrupt priority order determining circuits, a plurality of interrupt signal generating circuits, an interrupt vector address generating circuit that generates an interrupt vector address, and an instruction executing device.

The plurality of interrupt priority order determining circuits performs a logical operation on a plurality of control signals used for interrupt priority order modifying control that are applied from outside and a plurality of interrupt signals. Further, each of the interrupt priority determining circuits outputs an interrupt modifying signal. The plurality of interrupt signal generating circuits performs a logical operation on a plurality of the interrupt modifying signals and a plurality of interrupt request signals that is applied from outside the chip. Further, the plurality of interrupt signal generating circuits outputs the interrupt signals. The interrupt vector address generating circuit encodes the plurality of interrupt signals and generates an interrupt vector address. The instruction executing device decodes the interrupt instructions that have been received in a priority order from outside and successively executes the decoded results based on the interrupt vector address.

With the EVA chip of the present invention, the interrupt priority order of the interrupt signal generating circuits can be modified freely through the plurality of control signals for interrupt priority order modifying control that are applied from outside, so that the instruction execution device with different priority orders of the plurality of interrupt signal generating circuits can be supported by one type of EVA chip, which increases convenience and reduces costs.

With a configuration in which the plurality of control signals is generated by a plurality of priority order control registers, the number of control signal input terminals does not increase even when the number of interrupts is increased, so that the problem of inadequate space for the terminals can be averted.

With a configuration in which the plurality of control signals is generated by an interrupt priority order control shift register, the EVA chip can be operated in a stand-alone form that does not depend on a CPU for controlling the EVA chip.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An EVA chip of the present invention includes a plurality of interrupt priority order determining circuits, a plurality of interrupt signal generating circuits, an interrupt vector address generating circuit, and an instructing executing device. The plurality of interrupt priority order determining circuits performs a logical operation on a plurality of control signals used for interrupt priority order modifying control that is applied from outside the chip and a plurality of interrupt signals. Each of the interrupt priority determining circuits outputs an interrupt modifying signal. The plurality of interrupt signal generating circuits performs a logical operation on a plurality of the interrupt modifying signals and a plurality of interrupt request signals that are applied from outside. Further, the plurality of interrupt signal generating circuits outputs the interrupt signals. The interrupt vector address generating circuit encodes the plurality of interrupt signals and generates interrupt vector addresses. The instruction executing device is made of a microcomputer core to decode the interrupt instructions that have been received in a priority order from outside and to execute successively the decoded results based on the interrupt vector addresses.

Here, the plurality of control signals is input from external control signal input terminals or is generated by a plurality of priority order control registers that is provided internally based on data that are applied from outside the chip. Alternatively, the plurality of control signals may be generated during power-on by an interrupt priority order control shift register that is provided internally based on serial data that are applied from outside.

WORKING EXAMPLE 1

Configuration

Figure 1:
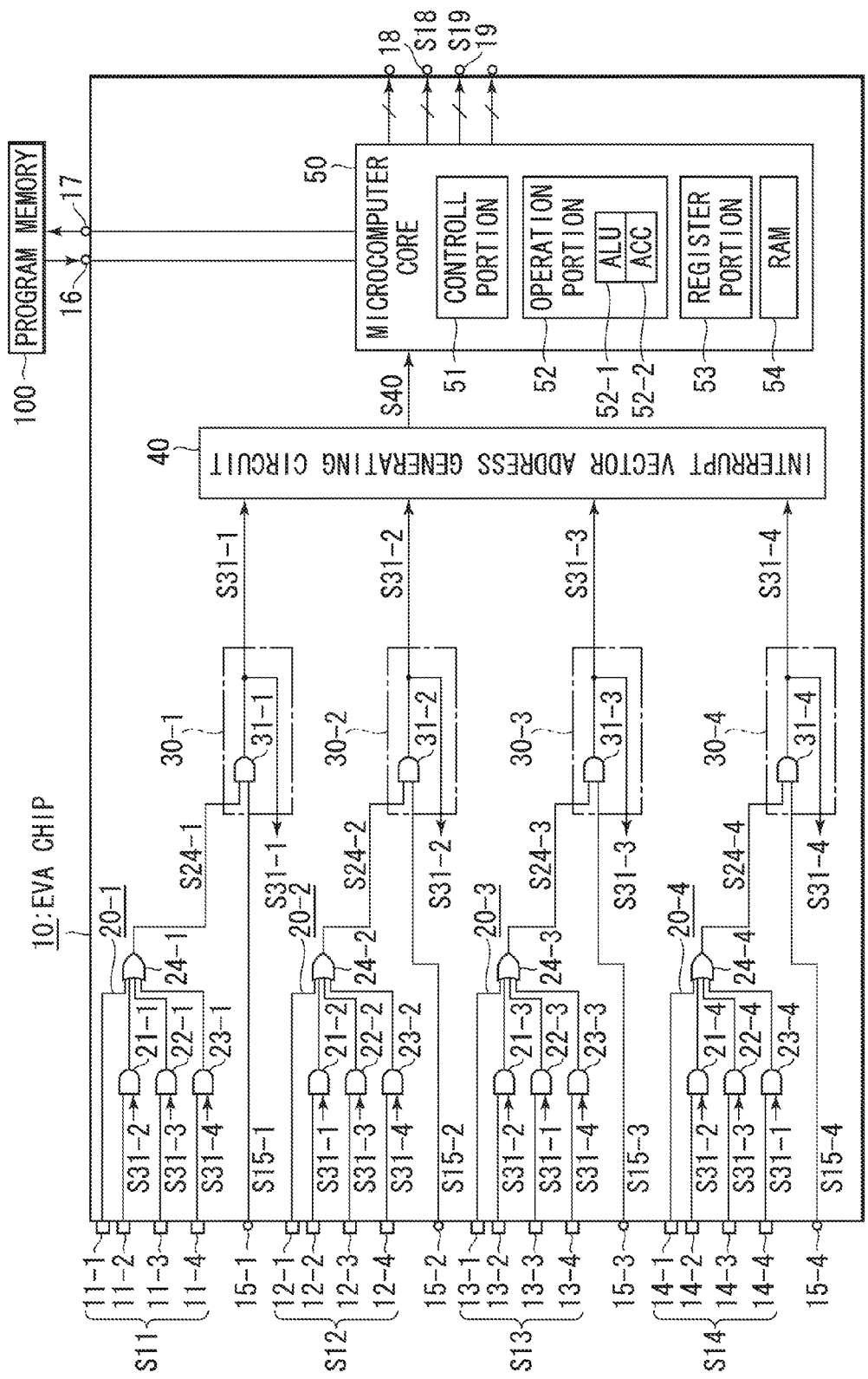
FIG. 1 is a view of a schematic diagram of an EVA chip according to a first working example of the present invention.

FIG. 1 a view of a schematic diagram showing an EVA chip 10 according to a first working example, Working Example 1, of the present invention.

The EVA chip 10 evaluates a program that is stored in an external program memory 100. The EVA chip 10 includes four sets of control signal input terminals 11-1 to 11-4, 12-1 to 12-4, 13-1 to 13-4, and 14-1 to 14-4, four interrupt request signal input terminals 15-1 to 15-4, an instruction input terminal 16, an address output terminal 17, a plurality of data output terminals 18, and a plurality of control signal output terminals 19. A plurality (for example, four) of four-bit control signals S11, S12, S13, and S14 used for interrupt priority order modifying control for the program is respectively input into the four sets of control signal input terminals 11-1 to 11-4, 12-1 to 12-4, 13-1 to 13-4, and 14-1 to 14-4. Four interrupt request signals are input into the four interrupt request signal input terminals 15-1 to 15-4. An instruction fetched from the program memory 100 is input into the instruction input terminal 16. The address output terminal 17 outputs an address to fetch the instruction. The plurality of control signal output terminals 19 outputs a plurality of control signals.

Each of the control signals S11, S12, S13, and S14 is respectively made of a four-bit digital signal, for example. Four interrupt priority order determining circuits 20-1 to 20-4 are respectively connected to the four sets of control signal input terminals 11-1 to 11-4, 12-1 to 12-4, 13-1 to 13-4, and 14-1 to 14-4 to input these digital signals. Each of the interrupt priority order determining circuits 20-1 to 20-4 is a circuit that respectively outputs the interrupt modifying signals S24-1 to S24-4 by performing a logical operation on the control signals S11 to S14 input from outside and three interrupt signals of the four interrupt signals S31-1 to S31-4 that are applied internally from the chip 10.

The interrupt priority order determining circuit 20-1 includes three 2-input AND gates 21-1, 22-1, 23-1 and one 4-input OR gate 24-1. The three 2-input AND gates 21-1, 22-1, and 23-1 are connected to the input terminals 11-2 to 11-4 and the interrupt signal lines S31-2 to S31-4. The one 4-input OR gate 24-1 is connected to the output terminals of the AND gates 21-1 to 23-1 and the input terminal 11-1. The interrupt modifying signal S24-1 is output from the OR gate 24-1. Similarly, each of the other interrupt priority order determining circuits 20-2 to 20-4 includes three 2-input AND gates 21-2 to 23-2, 21-3 to 23-3, 21-4 to 23-4 and one 4-input OR gate 24-2 to 24-4 and respectively outputs the interrupt modifying signals S24-2 to S24-4 from the OR gates 24-2 to 24-4. Four interrupt signal generating circuits (interrupt modules, for example) 30-1 to 30-4 are respectively connected to these interrupt modifying signal lines S24-1 to S24-4.

Each of the interrupt modules 30-1 to 30-4 is a circuit that respectively outputs the interrupt signals S31-1 to S31-4 by performing a logical operation (for example, AND logic) on the interrupt request signals S15-1 to S15-4 that are input from outside and the interrupt modifying signals S24-1 to S24-4, and includes one 2-input AND gate 31-1 to 31-4, for example. The interrupt signal lines S31-1 to S31-4 are connected to the input terminals of the AND gates 21-1 to 23-1, 21-2 to 23-2, 21-3 to 23-3, and 21-4 to 23-4 and to the interrupt vector address generating circuit 40. The interrupt vector address generating circuit 40 is a circuit that generates an interrupt vector address S40 by encoding the four interrupt signals S31-4 to S31-4 and includes encoder combination circuits, for example. An instruction executing device 50 (core of a target microcomputer that includes a CPU; hereafter "microcomputer core") is connected to the output terminal of the interrupt vector address generating circuit 40.

The microcomputer core 50 decodes interrupt instructions (interrupt programs) that have been fetched in a certain priority order from the program memory 100 based on the interrupt vector address S40 and successively executes the decoded results. The instruction input terminal 16, the address output terminal 17, the plurality of data output terminals 18, and the plurality of control signal output terminals 19 are connected to the microcomputer core 50. The microcomputer core 50 includes a control portion 51, an operation portion 52, a register portion 53, and a memory 54. The control portion 51 holds the interrupt program of the program memory 100 that has been fetched from the instruction input terminal 16 in an instruction register, for example, interprets the interrupt program with an instruction decoder, and outputs the control signals. The operation portion 52 executes arithmetic operations and logical operations of data with an arithmetic logic unit (hereafter "ALU") 52-1 and temporarily stores data in an accumulator 52-2 (hereafter "ACC"). The register portion 53 has registers and a program counter that specifies a read address for the program memory 100. The memory 54 (hereafter "RAM") is readable and writable to store data by random access.

For example, write data that are written into the ACC 52-2, write data of the RAM 54, and write addresses for the RAM 54 are output from the microcomputer core 50 to the outside from the plurality of data output terminals 18 through a data bus. Furthermore, an ACC data latch signal showing a latch timing of the write data of the ACC 52-2, a RAM data latch signal showing a latch timing of the write data that are written to the RAM 54, and a RAM address latch signal showing a latch timing of the RAM address are output from a control portion in the microcomputer core 50. Further, these signals are output to the outside from the plurality of control signal output terminals 19 through a plurality of signal lines.

Operation

When evaluating a program in the program memory 100 using the EVA chip 10, the EVA chip 10 outputs a write address from the register portion 53 inside the microcomputer core 50, gives the write address to the program memory 100 through the output terminal 17, and reads out the instruction corresponding to the write address. The instruction that has been read is sent to the control portion 51 inside the microcomputer core 50 through the input terminal 16. The control portion 51 temporarily stores the instruction from the program memory 100 in the instruction register, decodes the stored instruction with the instruction decoder and outputs the control signals that control the microcomputer core 50, and outputs an ACC data latch signal, a RAM data latch signal, and a RAM address latch signal, for example. The control portion 51 sends out these signals to the outside from the plurality of output terminals 19. The microcomputer core 50 executes the operation using, for example, the ACC 52-2 and ALU 52-1 inside the operation portion 52, stores in the RAM 54 the results of executing the instructions from the program memory 100, and sends out the execution results to the outside by the plurality of output terminals 18.

Based on the ACC data latch signal, for example, the ACC data are latched in an external device (not shown in the drawings) that is connected to the output terminals 18 and 19. Further, the ACC data are evaluated with a trace circuit or the like.

When the interrupt vector address S40 of the first priority rank is applied from the interrupt vector address generating circuit 40, based on the external interrupt request signals S15-1 to S15-4, while executing the instructions in the program memory 100, then the microcomputer core 50 suspends the instruction execution in progress and executes the interrupt program in the program memory 100 as specified in the interrupt vector address S40. The microcomputer core 50 resumes the suspended instruction execution when the execution of the interrupt program ends.

After this, the microcomputer core 50 performs the same interrupt process as above when the interrupt vector address S40 of the second, third, and fourth priority rank are successively applied from the interrupt vector address generating circuit 40, based on the external interrupt request signals S15-1 to S15-4.

The interrupt priority order in conventional EVA chips is previously determined by the order in which causes for the interrupts are connected. With Working Example 1, the interrupt priority order of each of interrupt module 30-1 to 30-4 can be switched as desired by the potential (logic level 0 for ground GND potential or logic level 1 for power source potential VCC) of the control signals S11 to S14 that are applied to the input terminals 11-1 to 11-4, 12-1 to 12-4, 13-1 to 13-4, and 14-1 to 14-4 from the outside.

For example, to set the interrupt priority order to the order of interrupt module 30-2→interrupt module 30-4→interrupt module 30-1→interrupt module 30-3, the potential of the control signals S11 to S14 that are applied to the input terminals 11-1 to 11-4, 12-1 to 12-4, 13-1 to 13-4, and 14-1 to 14-4 is set as follows. At that time, the potential of each of the interrupt request signals S15-1 to S15-4 that are applied to the external input terminals 15-1 to 15-4 is set to 1.

Potential of the control signal S11 applied to the input terminals 11-1 to 11-4: 0, 0, 0, 1

Potential of the control signal S12 applied to the input terminals 12-1 to 12-4: 1, 0, 0, 0

Potential of the control signal S13 applied to the input terminals 13-1 to 13-4: 0, 0, 1, 0

Potential of the control signal S14 applied to the input terminals 14-1 to 14-4: 0, 1, 0, 0

Since the potential of the input terminal 12-1 is 1, the potential of the interrupt modifying signal S24-2 output from the OR gate 24-2 becomes 1, the interrupt signal S31-2 output from the AND gate 31-2 becomes 1, and the interrupt module 30-2 assumes the first priority rank. Since the potential of the interrupt signal S31-2 is 1, the output potential of the AND gate 21-4 becomes 1, the potential of the interrupt modifying signal S24-4 output from the OR gate 24-4 becomes 1, the potential of the interrupt signal S31-4 output from the AND gate 31-4 becomes 1, and the interrupt module 30-4 assumes the second priority rank.

Since the potential of the interrupt signal S31-4 is 1, the output potential of the AND gate 23-1 becomes 1, the potential of the interrupt modifying signal S24-1 output from the OR gate 24-1 becomes 1, and the potential of the interrupt signal S31-1 output from the AND gate 31-1 becomes 1, and the interrupt module 30-1 assumes the third priority rank. Since the potential of the interrupt signal S31-1 becomes 1, the output potential of AND gate 22-3 is 1, the potential of the interrupt modifying signal S24-3 output from the OR gate 24-3 becomes 1, and the potential of the interrupt signal S31-3 output from the AND gate 31-3 becomes 1, and the interrupt module 30-3 assumes the fourth priority rank.

Therefore the interrupt vector addresses S40 corresponding to the interrupt signals S31-2, S31-4, S31-1, S31-3 of the first, second, third, and fourth priority ranks are output from the interrupt vector address generating circuit 40 and the microcomputer core 50 performs the interrupt process according to this priority order.

Effect

With Working Example 1, the priority order of the interrupt modules 30-1 to 30-4 can be modified freely through the potential of the control signals S11 to S14 that are applied from outside to the input terminals 11-1 to 11-4, 12-1 to 12-4, 13-1 to 13-4, and 14-1 to 14-4, so that microcomputer cores 50 with different priority orders of the interrupt modules 30-1 to 30-4 can be supported by one type of EVA chip 10, which increases convenience and reduces costs.

WORKING EXAMPLE 2

Configuration

Figure 2:
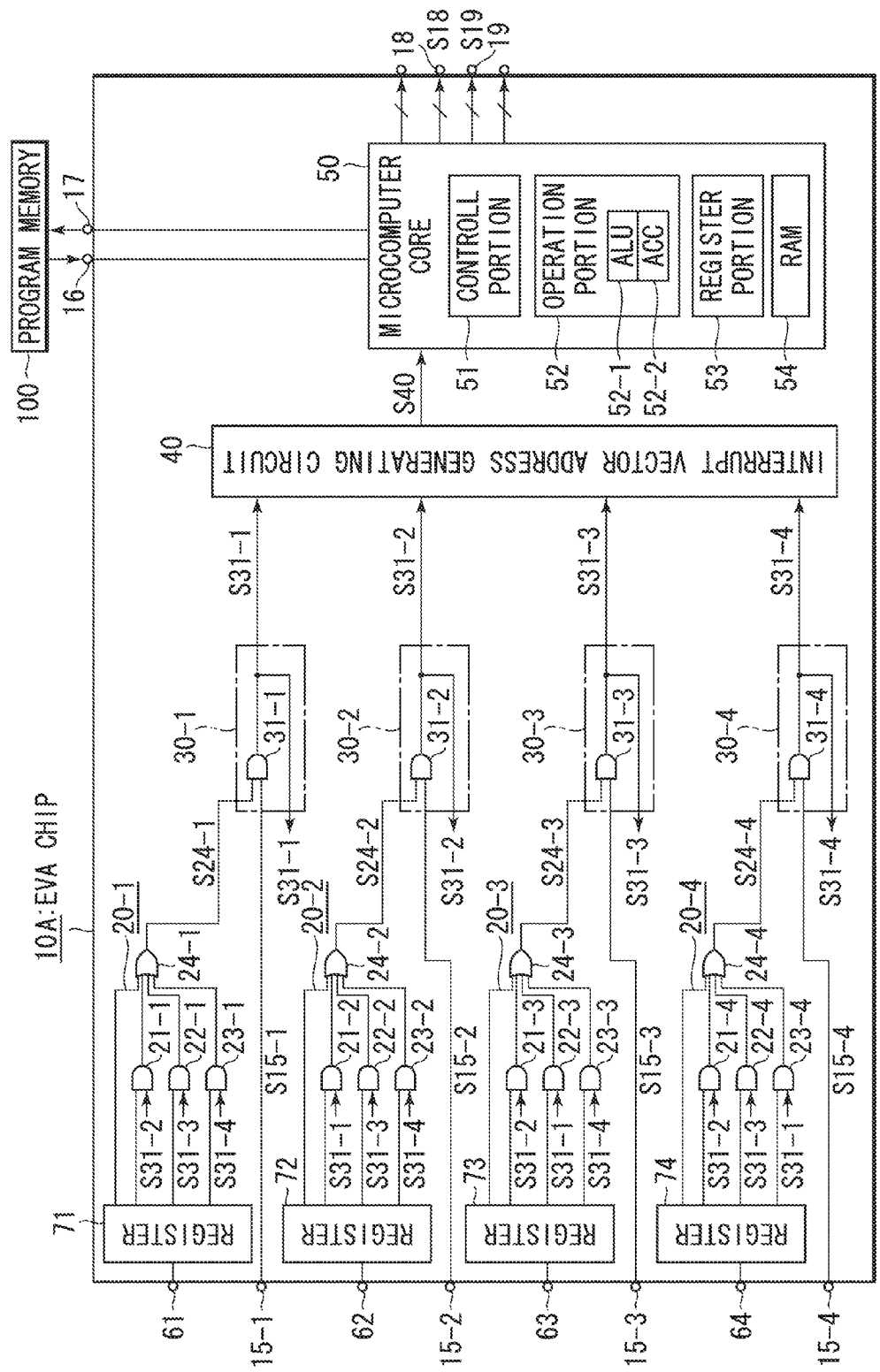
FIG. 2 is a view of a schematic diagram of an EVA chip according to a second working example of the present invention.

FIG. 2 is a schematic diagram showing an EVA chip 10A according to a second working example, Working Example 2, of the present invention. Like symbols are used for structural elements that are the same as or similar to those in FIG. 1 of Working Example 1.

In the EVA chip 10 of Working Example 1, the control signal input terminals 11-1 to 11-4, 12-1 to 12-4, 13-1 to 13-4, and 14-1 to 14-4 are provided to switch the interrupt priority order of the interrupt modules 30-1 to 30-4. In the EVA chip 10A of Working Example 2, on the other hand, four data input terminals 61 to 64 and four priority order control registers 71 to 74 that are respectively connected to these terminals are provided instead of the control signal input terminals 11-1 to 11-4, 12-1 to 12-4, 13-1 to 13-4, and 14-1 to 14-4.

Data regarding the interrupt priority order are input to the data input terminals 61 to 64 from a CPU that controls the EVA chip 10A. The priority order control registers 71 to 74 are circuits that hold the data that are input from the data input terminals 61 to 64, and respectively outputs four-bit signals that correspond to the four-bit control signals for the interrupt priority order modifying control of FIG. 1. The output terminals of the circuits are connected to the same AND gates 21-1 to 23-1, 21-2 to 23-2, 21-3 to 23-3, 21-4 to 23-4 and OR gates 24-1 to 24-4 as in FIG. 1. The rest of the configuration is similar to or the same as in Working Example 1 shown in FIG. 1.

Operation

The operation is similar to or the same as in Working Example 1 when evaluating a program in the program memory 100 using the EVA chip 10A.

In Working Example 2, it is possible to switch freely the interrupt priority order of the interrupt modules 30-1 to 30-4 by writing data applied, for example, from a CPU that controls the EVA chip 10A into the priority order control registers 71 to 74 through the data input terminals 61 to 64.

For example, to set the interrupt priority order to the order of interrupt module 30-2→interrupt module 30-4→interrupt module 30-1→interrupt module 30-3, the potential of the four bit output terminals of the priority order control registers 71 to 74 are set from the outside through the data input terminals 61 to 64 to the following conditions. At that time, the potential of each of the interrupt request signals S15-1 to S15-4 that are applied externally to the input terminals 15-1 to 15-4 is set to logic 1.

Potential of the four-bit output terminals of the priority order control register 71: 01H (=0, 0, 0, 1)

Potential of the four-bit output terminals of the priority order control register 72: 08H (=1, 0, 0, 0)

Potential of the four-bit output terminals of the priority order control register 73: 02H (=0, 0, 1, 0)

Potential of the four-bit output terminals of the priority order control register 74: 04H (=0, 1, 0, 0)

Since the potential of the output terminal of the first bit from above of the priority order control register 72 is 1, as in Working Example 1, the potential of the interrupt modifying signal S24-2 output from the OR gate 24-2 becomes 1, the interrupt signal S31-2 output from the AND gate 31-2 becomes 1, and the interrupt module 30-2 assumes the first priority rank. Since the potential of the interrupt signal S31-2 is 1, the output potential of the AND gate 21-4 becomes 1, the potential of the interrupt modifying signal S24-4 output from the OR gate 24-4 becomes 1, the potential of the interrupt signal S31-4 output from the AND gate 31-4 becomes 1, and the interrupt module 30-4 assumes the second priority rank. Since the potential of the interrupt signal 31-4 is 1, the output potential of the AND gate S23-1 becomes 1, the potential of the interrupt modifying signal S24-1 output from the OR gate 24-1 becomes 1, the potential of the interrupt signal S31-1 output from the AND gate 31-1 becomes 1, and the interrupt module 30-1 assumes the third priority rank. Since the potential of the interrupt signal S31-1 is 1, the output potential of the AND gate 22-3 becomes 1, the potential of the interrupt modifying signal S24-3 output from the OR gate 24-3 becomes 1, the potential of the interrupt signal S31-3 of the output of the AND gate S31-3 becomes 1, and the interrupt module 30-3 assumes the fourth priority rank.

Therefore, as in Working Example 1, the interrupt vector address S40 that corresponds to the interrupt signals S31-2, S31-4, S31-1, S31-3 of the first, second, third, and fourth priority rank are output from the interrupt vector address generating circuit 40 and the microcomputer core 50 performs interrupt processing according to this priority order.

Effect

In Working Example 2, there are the two following effects (1) and (2):

(1) With Working Example 2, the interrupt priority order of the interrupt modules 30-1 to 30-4 can be modified freely by writing data applied from a CPU or the like controlling the EVA chip 10A into the priority order control registers 71 to 74, so that microcomputer cores 50 with different priority orders of the interrupt modules 30-1 to 30-4 can be supported by one type of EVA chip 10A, which is convenient and reduces costs.

(2) In Working Example 1, when the number of the interrupts increases, the number of the control signal input terminals 11-1 to 11-4, 12-1 to 12-4, 13-1 to 13-4, and 14-1 to 14-4 controlling the EVA chip 10 also increases, resulting in inadequate space for the EVA terminals. With Working Example 2, on the other hand, the problem of too little space for the terminals can be solved by providing the priority order control registers 71 to 74 inside the EVA chip 10A.

WORKING EXAMPLE 3

Configuration

Figure 3:
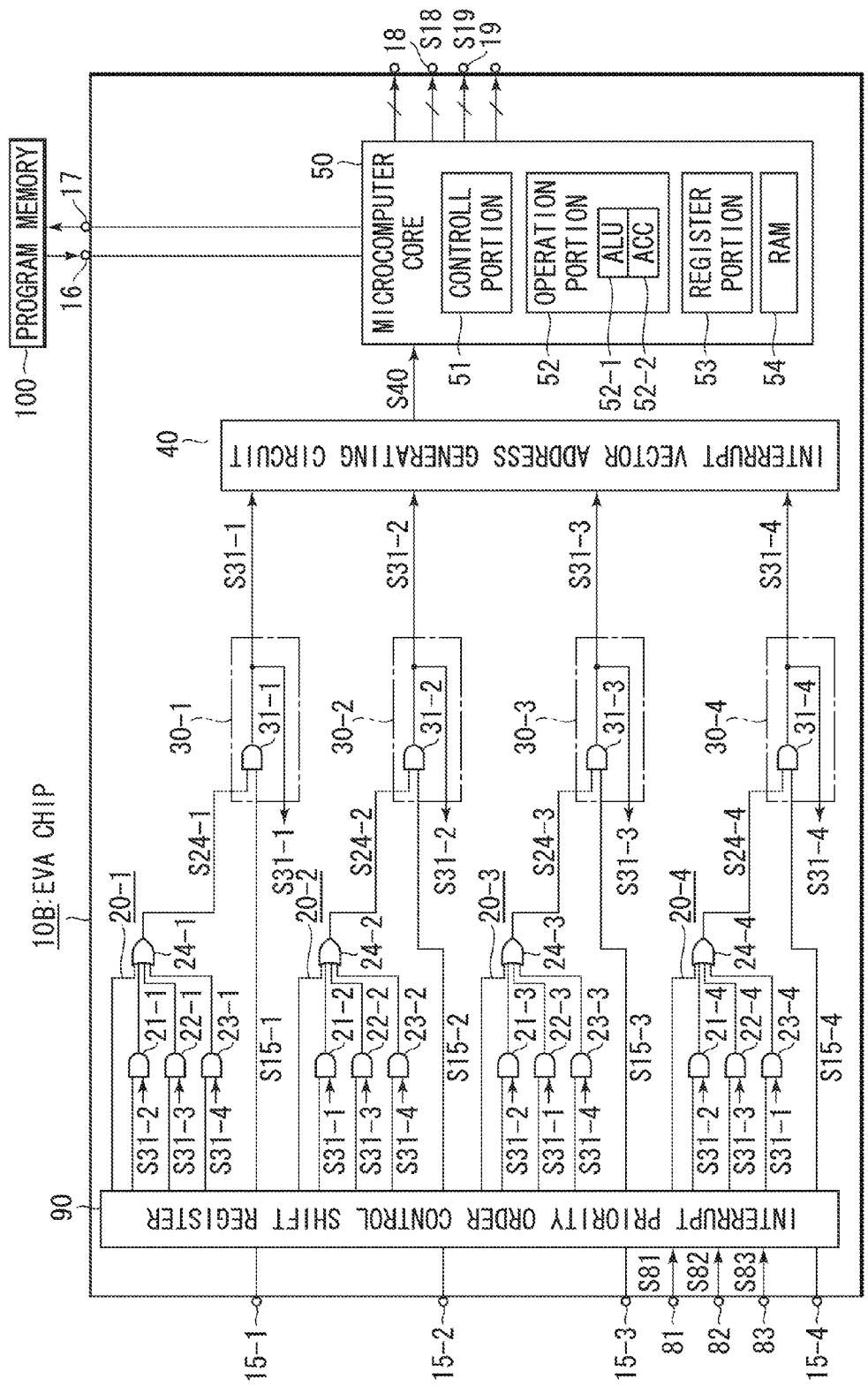
FIG. 3 is a view of a schematic diagram of an EVA chip according to a third working example of the present invention.

FIG. 3 is a schematic diagram of an EVA chip 10B according to a third working example, Working Example 3, of the present invention. Like symbols are used for structural elements that are the same as in Working Example 1 in FIG. 1 and Working Example 2 FIG. 2.

In the EVA chip 10A of Working Example 2, data input terminals 61 to 64 and priority order control registers 71 to 74 are provided to switch the interrupt priority order of the interrupt modules 30-1 to 30-4. In the EVA chip 10B of Working Example 3, on the other hand, three input terminals 81 to 83 and a 12-bit interrupt priority order control shift registers 90 that is connected to these terminals are provided instead of the data input terminals 61 to 64 and the priority order control registers 71 to 74.

At the input terminal 81, serial 12-bit priority order data S81 are input from outside; at the input terminal 82, a synchronization clock S82 is input from outside; and at the input terminal 83, a clock enable signal S83 is input from outside. The 12-bit interrupt priority order control shift register 90 is a circuit that receives the serial 12-bit data S81 that is applied from outside and converts it into parallel data based on the synchronization clock S82 that is applied from outside. The 12-bit interrupt priority order control shift register 90 outputs in parallel a 16 bit-signal that corresponds to the four 4-bit control signals used for interrupt priority order modifying control in FIG. 1. The 16 output terminals of the circuit are connected to the AND gates 21-1 to 23-1, 21-2 to 23-2, 21-3 to 23-3, and 21-4 to 23-4 and OR gates 24-1 to 24-4, as in FIG. 1. The rest of the configuration is similar to or the same as in Working Example 1 in FIG. 1 and Working Example 2 FIG. 2.

Operation

The operation is similar to or the same as in Working Examples 1 and 2 when evaluating a program in the program memory 100 using the EVA chip 10B.

In Working Example 3, the priority order is determined as follows: the serial 12-bit data S81 that have been prepared beforehand, for example by a switch outside the EVA chip, are transmitted to the input terminal 81 by synchronous serial transfer. The serial 12-bit data S81 are received by the shift register 90 based on the synchronization clock S82. When the transmission is over, the serial 12-bit data S81 are converted into parallel data by the shift register 90 and output. The input terminal 83 is provided for the clock enable signal S83 that controls that the synchronization clock S82 for the shift register 90 is enabled, and the clock enable signal S83 is set to enabled during a logical "L" period of a power reset for resetting the device during power-on, for example.

For example, to set the interrupt priority order to the order of interrupt module 30-2→interrupt module 30-4→interrupt module 30-1→interrupt module 30-3, the following serial 12 bit data S81 that have been prepared beforehand, for example by a switch outside the EVA chip, are transmitted to the shift register 90 through the input terminal 81. At that time, the potential of each of the interrupt request signals S15-1 to S15-4 that are applied from outside to the input terminals 15-1 to 15-4 is set to logic 1.

Serial 12 bit data S81: 0, 0, 0, 1/1, 0, 0, 0/0, 0, 1, 0/0, 1, 0, 0

Since the potential of the output terminal of the fifth bit from above of the shift register 90 is 1, the potential of the interrupt modifying signal S24-2 output from the OR gate 24-2 becomes 1, the interrupt signal S31-2 output from the AND gate 31-2 becomes 1, and the interrupt module 30-2 assumes the first priority rank, as in Working Examples 1 and 2. Since the potential of the interrupt signal S31-2 is 1, the output potential of the AND gate 21-4 becomes 1, the potential of the interrupt modifying signal S24-4 output from the OR gate 24-4 becomes 1, the potential of the interrupt signal S31-4 output from the AND gate 31-4 becomes 1, and the interrupt module 30-4 assumes the second priority rank.

Since the potential of the interrupt signal 31-4 is 1, the output potential of the AND gate 23-1 becomes 1, the potential of the interrupt modifying signal S24-1 output from the OR gate 24-1 becomes 1, the potential of the interrupt signal S31-1 output from the AND gate 31-1 becomes 1, and the interrupt module 30-1 assumes the third priority rank. Since the potential of the interrupt signal S31-1 is 1, the output potential of AND gate 22-3 becomes 1, the potential of the interrupt modifying signal S24-3 output from OR gate 24-3 becomes 1, the potential of the interrupt signal S31-3 output from the AND gate S31-3 becomes 1, and the interrupt module 30-3 assumes the fourth priority rank.

Therefore, as in Working Examples 1 and 2, the interrupt vector addresses S40 that correspond to the interrupt signals S31-2, S31-4, S31-1, S31-3 of the first, second, third, and fourth priority rank are output from the interrupt vector address generating circuit 40 and the microcomputer core 50 performs interrupt processing according to this priority order.

Effects

In Working Example 3, there are the two following effects (1) and (2):

(1) With Working Example 3, the interrupt priority order of the interrupt modules 30-1 to 30-4 can be modified freely through the parallel output data of the interrupt priority order control shift register 90, so that as in Working Examples 1 and 2, microcomputer cores 50 with different priority orders of the interrupt modules 30-1 to 30-4 can be supported by one type of EVA chip 10B, which increases convenience and reduces costs.

(2) Working Example 2 cannot be realized in a stand-alone mode (i.e. in a form where all the operations from input to output can be completed by the functionality of the device itself), because data must be written into the registers 71 to 74 by a CPU for EVA chip control, for example.

Working Example 3, on the other hand, can operate in stand-alone mode that does not depend on a CPU for controlling the EVA chip 10B for example, because by installing the shift register 90, the interrupt priority order is determined when the power of the EVA chip 10B is activated.

The present invention is not limited to the working examples described above, and various modifications are possible. As an example of such modifications, the following configurations (a) and (b) are possible as a Working Example 4.

(a) The number or the bit number of the interrupt priority order determining circuits 20-1 to 20-4, the interrupt modules 30-1 to 30-4, the priority order control registers 71 to 74, and the interrupt priority order control shift registers 90 can be changed freely for the number of the interrupts. Further, it is also possible to configure them by circuits not shown in the figures.

(b) The microcomputer core 50 can be changed to a configuration not shown in the figures, for example by adding other function blocks or the like.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-093053. The entire disclosure of Japanese Patent Application No. 2004-093053 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An evaluation chip comprising:
   a plurality of interrupt priority order determining circuits being configured to perform a logical operation on a plurality of control signals used for interrupt priority order modifying control and a plurality of interrupt signals, said plurality of control signals being applied from outside said evaluation chip, each of said plurality of interrupt priority determining circuits being configured to output an interrupt modifying signal;

a plurality of interrupt signal generating circuits being configured to perform a logical operation on a plurality of said interrupt modifying signals and a plurality of interrupt request signals being applied from outside said evaluation chip, said plurality of interrupt signal generating circuits being configured to output said interrupt signals;

an interrupt vector address generating circuit being configured to encode said plurality of interrupt signals and to generate interrupt vector addresses; and an instruction executing device being configured to decode interrupt instructions having been received in a priority order from outside said evaluation chip and to encode successively decoded results based on said interrupt vector addresses.

2. The evaluation chip according to claim 1, wherein said plurality of control signals is input from external control signal input terminals.

3. The evaluation chip according to claim 2, wherein said instruction executing device includes a control portion, an operation portion, a register portion, and a memory.

4. The evaluation chip according to claim 3, wherein said operation portion includes an arithmetic logic unit configured to execute arithmetic operations and an accumulator configured to store data temporarily.

5. The evaluation chip according to claim 4, wherein said memory is random access memory.

6. The evaluation chip according to claim 5, wherein write data that are written into the accumulator, write data of the random access memory, and write addresses for the random access memory are output through a data bus to at least one output terminal.

7. An evaluation chip comprising:

a plurality of priority order control registers being configured to generate a plurality of control signals based on data that are applied from outside said evaluation chip;

a plurality of interrupt priority order determining circuits being configured to perform a logical operation on said plurality of control signals used for interrupt priority order modifying control and a plurality of interrupt signals, each of said plurality of interrupt priority determining circuits being configured to output an interrupt modifying signal;

a plurality of interrupt signal generating circuits being configured to perform a logical operation on a plurality of said interrupt modifying signals and a plurality of interrupt request signals being applied from outside said evaluation chip, said plurality of interrupt signal generating circuits being configured to output said interrupt signals;

an interrupt vector address generating circuit being configured to encode said plurality of interrupt signals and to generate interrupt vector addresses; and an instruction executing device being configured to decode interrupt instructions having been received in a priority order from outside said evaluation chip and to encode successively decoded results based on said interrupt vector addresses.

8. The evaluation chip according to claim 7, wherein said instruction executing device includes a control portion, an operation portion, a register portion, and a memory.

9. The evaluation chip according to claim 8, wherein said operation portion includes an arithmetic logic unit configured to execute arithmetic operations and an accumulator configured to store data temporarily.

10. The evaluation chip according to claim 9, wherein said memory is random access memory.

11. The evaluation chip according to claim 10, wherein write data that are written into the accumulator, write data of the random access memory, and write addresses for the random access memory are output through a data bus to at least one output terminal.

12. An evaluation chip comprising:

an interrupt priority order control shift register being configured to generates a plurality of control signals based on serial data that are applied from outside said evaluation chip during power-on;

a plurality of interrupt priority order determining circuits being configured to perform a logical operation on said plurality of control signals used for interrupt priority order modifying control and a plurality of interrupt signals, each of said plurality of interrupt priority determining circuits being configured to output an interrupt modifying signal;

a plurality of interrupt signal generating circuits being configured to perform a logical operation on a plurality of said interrupt modifying signals and a plurality of interrupt request signals being applied from outside said evaluation chip, said plurality of interrupt signal generating circuits being configured to output said interrupt signals;

an interrupt vector address generating circuit being configured to encode said plurality of interrupt signals and to generate interrupt vector addresses; and an instruction executing device being configured to decode interrupt instructions having been received in a priority order from outside said evaluation chip and to encode successively decoded results based on said interrupt vector addresses.

13. The evaluation chip according to claim 12, wherein said instruction executing device includes a control portion, an operation portion, a register portion, and a memory.

14. The evaluation chip according to claim 13, wherein said operation portion includes an arithmetic logic unit configured to execute arithmetic operations and an accumulator configured to store data temporarily.

15. The evaluation chip according to claim 14, wherein said memory is random access memory.

16. The evaluation chip according to claim 15, wherein write data that are written into the accumulator, write data of the random access memory, and write addresses for the random access memory are output through a data bus to at least one output terminal.

* * * * *